United States Patent
Ikeda

(10) Patent No.: US 10,547,388 B2
(45) Date of Patent: Jan. 28, 2020

(54) OPTICAL TRANSMITTER, OPTICAL TRANSMISSION APPARATUS, AND METHOD OF CONTROLLING OPTICAL TRANSMITTER

(71) Applicant: FUJITSU LIMITED, Kawasaki-shi, Kanagawa (JP)

(72) Inventor: Katsuhiro Ikeda, Sendai (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/150,812

(22) Filed: Oct. 3, 2018

(65) Prior Publication Data

US 2019/0115980 A1 Apr. 18, 2019

(30) Foreign Application Priority Data

Oct. 13, 2017 (JP) ................................. 2017-199756

(51) Int. Cl.
*H04B 10/04* (2006.01)
*H04B 10/516* (2013.01)
*H04B 10/50* (2013.01)

(52) U.S. Cl.
CPC ..... *H04B 10/516* (2013.01); *H04B 10/50575* (2013.01)

(58) Field of Classification Search
CPC ............ H04B 10/516; H04B 10/50575; H04B 10/5053; H04B 10/0795; H04B 10/2507; H04B 10/50572; H04B 10/54; H04B 10/541; H04B 10/588; H04B 10/505; H04B 10/58; H04B 10/50593; H04B 10/50595; H04B 10/5051; H04B 10/50577; H04B 10/503; H04B 10/50597; G02F 1/0123; G02F 2203/19; G02F 2001/212

USPC ....... 398/183, 185, 186, 188, 192, 194, 195, 398/198, 182

See application file for complete search history.

(56) References Cited

U.S. PATENT DOCUMENTS

| | | | |
|---|---|---|---|
| 8,989,600 B2* | 3/2015 | Nakamoto | H04B 10/5051 359/238 |
| 9,001,407 B2* | 4/2015 | Li | G02F 1/0123 359/239 |
| 9,116,368 B2* | 8/2015 | Kawakami | G02F 1/0123 |
| 9,130,680 B2* | 9/2015 | Akiyama | H04B 10/2513 |
| 9,312,961 B2* | 4/2016 | Le Taillandier De Gabory | H04B 10/516 |
| 9,350,455 B2* | 5/2016 | Akiyama | G02F 1/0123 |
| 9,705,592 B1* | 7/2017 | Schmogrow | G02F 1/2255 |
| 10,090,921 B2* | 10/2018 | Yoneyama | H04B 10/50575 |

(Continued)

FOREIGN PATENT DOCUMENTS

JP 2015-114499 6/2015
JP 2015-128245 7/2015

*Primary Examiner* — Hibret A Woldekidan
(74) *Attorney, Agent, or Firm* — Fujitsu Patent Center

(57) ABSTRACT

An optical transmitter includes an optical modulator including a first modulator, a second modulator, and a phase shifter that provides a predetermined optical phase difference between the first modulator and the second modulator, a light source that makes light enter the optical modulator, and a voltage controller that detects a distortion of light power characteristics from output light of the optical modulator in a state where no data signal is input to the optical modulator to determine a bias voltage to be set in the optical modulator while reducing the distortion.

18 Claims, 16 Drawing Sheets

(56) References Cited

U.S. PATENT DOCUMENTS

| | | | |
|---|---|---|---|
| 2005/0238362 A1* | 10/2005 | Sekiya | H04B 10/0795 398/147 |
| 2014/0233965 A1* | 8/2014 | Kim | H04B 10/5053 398/188 |
| 2014/0334829 A1* | 11/2014 | Akiyama | G02F 1/0123 398/186 |
| 2015/0171971 A1* | 6/2015 | Enoki | H04B 10/50575 398/183 |
| 2016/0099776 A1* | 4/2016 | Nakashima | H04B 10/50572 398/186 |

* cited by examiner

OPTICAL TRANSMITTER, OPTICAL TRANSMISSION APPARATUS, AND METHOD OF CONTROLLING OPTICAL TRANSMITTER

CROSS-REFERENCE TO RELATED APPLICATION

This application is based upon and claims the benefit of priority of the prior Japanese Patent Application No. 2017-199756, filed on Oct. 13, 2017, the entire contents of which are incorporated herein by reference.

FIELD

The embodiments discussed herein are related to an optical transmitter, an optical transmission apparatus, and a method of controlling the optical transmitter.

BACKGROUND

In long-distance and high-speed optical transmission systems, optical modulators (hereinafter referred to as "LN modulator") utilizing the electro-optic effects of a dielectric such as LiNbO3 are used. Coherent light is input to the LN modulator from the outside, and the LN modulator modulates the light by changing the optical phase (hereinafter simply referred to as "phase") with a high-speed electric signal. When the light is modulated, a DC bias is applied to the optical modulator to create a phase reference. The LN modulator has a bias shift phenomenon in which the phase reference point (for example, the optimum value of the bias voltage) changes with time. This phenomenon is called "DC drift". Automatic bias control (ABC) is performed to follow the DC drift. The ABC has also been employed in optical digital coherent communication, which is the main stream of today.

In an I/Q modulator that handles signal components whose phases are offset by 90° from each other, bias control is individually performed at each of the I (in-phase) channel, the Q (quadrature) channel, and the phase shifter that adjusts orthogonality between I and Q. When bias voltage control of the I channel, the Q channel, and the phase shifter is performed in time division, in general, while the bias voltage control of one branch (for example, I channel) is being performed, the bias voltages of the other two branches are fixed.

A low frequency pilot signal is generally used for drift control of the bias voltage. The pilot signal is superimposed on the bias voltage applied to the optical modulator, and the phase of the pilot signal included in the output light of the modulator is detected to control the bias voltage to the optimum operating point. FIG. 1 is a schematic diagram of a superimposed pilot signal and an observation pilot signal in bias voltage control. The pilot signal to be superimposed is indicated as one period of a sinusoidal waveform with frequency f0 [Hz]. The waveform of the pilot signal to be observed varies depending on the deviation direction of the applied bias voltage (inclination of light power). At the bias voltage A where the inclination of the light power characteristics is negative, a signal whose phase is inverted with the same frequency f0 as the superimposed pilot signal is observed. At the bias voltage B where the inclination of the light power characteristics is zero, a signal with twice the frequency (2f0) is detected and the superimposed pilot signal is not observed. At the bias voltage C where the inclination of the light power characteristics is positive, a signal having the same frequency f0 and the same phase as the superimposed pilot signal is observed. The control direction (sweep direction) of the bias voltage is determined from the frequency and the phase of the observed pilot signal. The bias voltage is swept to the position where the inclination of the light power characteristics curve is zero (a valley or a mountain of the light power characteristics curve).

A method of determining the initial value of the bias voltage to be applied to each of the two modulators in a short time has been offered.

The light power characteristics of FIG. 1 are indicated as an ideal cosine curve. However, the output light power characteristics of the LN modulator may deviate greatly from the ideal cosine curve depending on the bias voltage values of the I channel, the Q channel, and the phase shifter and the signal amplitude at the time of high speed data signal communication.

FIGS. 2A-2C are diagrams illustrating the distortion of the light power characteristics with respect to the bias voltage (hereinafter simply referred to as "light power characteristics"). In these figures, the light power characteristics at the time of the bias voltage control of the I channel in the ABC process at the time of start-up without the input of the data signal (detection of the emission/quenching reference phases of I channel and Q channel and setting of the quadrature phase between I and Q) are plotted. The bias voltage of the I channel is normalized to emit light at 0 V and quench light at 1 V (Vπ=1 V). FIG. 2A depicts an ideal shape. At this time, the bias voltage of the Q channel is 1 V and the bias voltage (φ) of the phase shifter is 1 V. Distortion is seen in FIG. 2B and FIG. 2C. In FIG. 2B, the bias voltage of the Q channel is 0.8 V, and the bias voltage (φ) of the phase shifter is 1 V. In FIG. 2C, the bias voltage of the Q channel is 0.6 V and the bias voltage (φ) of the phase shifter is 1 V. In FIG. 2B and FIG. 2C, the bias voltage at which the light power is minimized deviates from the point of 1 V, and the light power is bilaterally asymmetric with respect to the bias voltage at which the light power is minimized. Such distortion in the phase direction means that emission/quenching of the LN modulator is not performed normally.

The shape of the light power characteristics curve is changed each time respective bias voltages of the I channel, the Q channel, and the phase shifter are swept. The distortion of the light power characteristics is not necessarily reduced by the sweep of the bias voltage. The distortion may remain until the end while changing the shape of the curve.

The following is a reference document.
[Document 1] Japanese Laid-open Patent Publication No. 2015-114499.

SUMMARY

According to an aspect of the embodiments, an optical transmitter includes an optical modulator including a first modulator, a second modulator, and a phase shifter that provides a predetermined optical phase difference between the first modulator and the second modulator, a light source that makes light enter the optical modulator, and a voltage controller that detects a distortion of light power characteristics from output light of the optical modulator in a state where no data signal is input to the optical modulator to determine a bias voltage to be set in the optical modulator while reducing the distortion.

The object and advantages of the invention will be realized and attained by means of the elements and combinations particularly pointed out in the claims.

DESCRIPTION OF EMBODIMENTS

In the embodiment, by detecting and correcting the distortion of the light power characteristics during the setting process of the optimum bias using a pilot signal at the time of activating the optical transmitter, the distortion of the light power characteristics is minimized, and the performance of bias control is improved.

Figure 3:
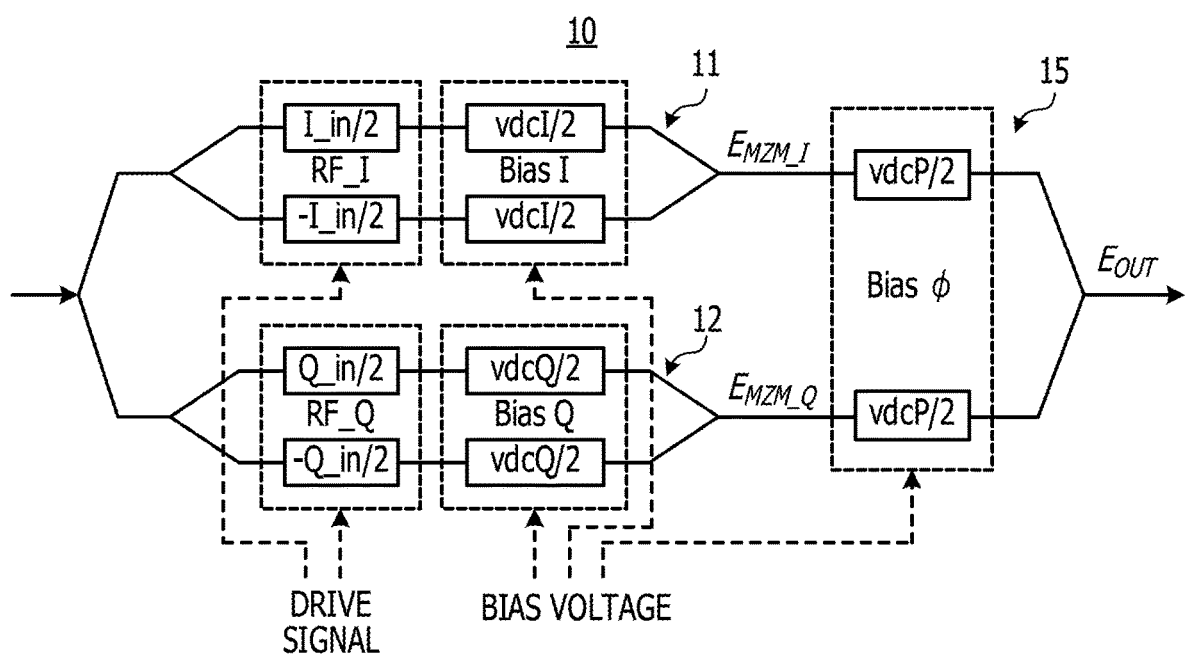
FIG. 3 is a diagram illustrating the basic principle of the embodiment, and is a schematic diagram of an optical modulator used in an optical transmitter of the embodiment.

FIG. 3 is a diagram for illustrating the basic principle of the embodiment, schematically illustrating an optical modulator 10 used in an optical transmitter of the embodiment. The optical modulator 10 includes a first modulator 11 and a second modulator 12 connected in parallel, and a phase shifter 15 for adjusting orthogonality of the phases between the first modulator 11 and the second modulator. Each of the first modulator 11 and the second modulator 12 is formed by a Mach-Zehnder (MZ) interferometer having a pair of optical waveguides.

One of the two modulators, for example the first modulator 11, handles a signal component in phase with a carrier wave (I channel). The other modulator, for example the second modulator 12, handles a quadrature signal component with the carrier wave (Q channel). By controlling the bias voltage the I channel and the bias voltage of the Q channel, the light intensity of the I channel and the light intensity of the Q channel are adjusted. By controlling the bias voltage of the phase shifter 15, the angle (orthogonality) between the I channel and the Q channel is adjusted.

Respective data signals are input to the first modulator 11 and the second modulator. For example, respective high-speed drive signals generated from the data signals are input to the first modulator 11 and the second modulator 12. A high-speed drive signal input to the first modulator 11 is defined as RF-I, and a high-speed drive signal input to the second modulator 12 is defined as RF-Q. The drive signal RF-I is input to the pair of optical waveguides of the first modulator 11 as differential signals represented by I_in/2 and −I_in/2. The drive signal RF-2 is input to the pair of optical waveguides of the second modulator 12 as differential signals represented by Q_in/2 and −Q_in/2.

When a DC bias applied to the first modulator 11 is defined as vdcI, the bias voltage applied to each optical waveguide of the first modulator 11 is vdcI/2. When a DC bias applied to the second modulator 12 is defined as vdcQ, the bias voltage applied to each optical waveguide of the second modulator 12 is vdcQ/2.

In the phase shifter 15, a bias voltage ($\varphi$) for phase adjustment that provides orthogonality between I and Q is defined as vdcP. When phase adjustment for orthogonality is performed in both the I channel and the Q channel, bias voltages applied to the I channel and the Q channel are vdcP/2 for simplicity.

When the signal after application of the bias voltage (Bias I) in the I channel is defined as EMZM_I, the signal after applying the bias voltage (Bias Q) in the Q channel is defined as EMZM_Q, and the output of the optical modulator 10 is defined as EOUT, the optical characteristics of the optical modulator 10 is expressed by Equation (1).

$$E_{OUT} = E_{MZM\_I} \cdot e^{-j\pi(vdcP/2)} + E_{MZM\_Q} \cdot e^{j\pi(vdcP/2)}$$

$$E_{MZM\_I} = e^{j\phi_{uI}} + e^{j\phi_{dI}}$$

$$E_{MZM\_Q} = e^{j\phi_{uQ}} + e^{j\phi_{dQ}}$$

$$\phi_{uI} = \pi(I\_in/2 + vdcI/2)$$

$$\phi_{dI} = -\pi(I\_in/2 + vdcI/2))$$

$$\phi_{uQ} = \pi(Q\_in/2 + vdcQ/2)$$

$$\phi_{dQ} = -\pi(Q\_in/2 + vdcQ/2) \quad (1)$$

$\varphi_{uI}$ is the phase of light passing through the upper arm of the first modulator 11, $\varphi_{dI}$ is the phase of light passing through the lower arm of the first modulator 11, $\varphi_{uQ}$ is the phase of light passing through the upper arm of the second modulator 12, and $\varphi_{dQ}$ is the phase of light passing through the lower arm of the second modulator 12. They are normalized so that the phase becomes $\pi$ at 1 V (V$\pi$=1 V). For the sake of simplicity, the element of the amplitude is omitted.

At the time of activation, assuming that there is no RF signal input (I_in=0, Q_in=0), the light power |EOUT|$^2$ is calculated. Using the trigonometric function formulas, Equation (1) may be rearranged as in Equation (2). Calculation processing is omitted.

$$|E_{OUT}|^2 = 4 + 2[\cos(\pi \cdot vdcI) + \cos(\pi \cdot vdcQ) + 4\cos(\pi \cdot vdcP)\cos(\pi \cdot vdcI/2)\cos(\pi \cdot vdcQ/2)] \quad (2)$$

Considering Equation (2) as a function of vdcI, cos ($\pi$·vdcI) is a component of the cosine curve of the light power characteristics without distortion of period 2V$\pi$ [V], and it may be estimated that cos($\pi$·vdcI/2) of period 4V$\pi$ [V] is added as a distortion component. The influence amount of distortion depends on $\cos(\pi \cdot vdcQ/2)$ and $\cos(\pi \cdot vdcP)$. The same is true when Equation (2) is considered as a function of vdcQ.

The embodiment is based on this finding. When controlling the bias voltage of the I channel to the optimum operating point at the time of activation of the optical transmitter, by adjusting at least one of the bias voltage of the Q channel and the bias voltage of the phase shifter 15, the effect of distortion of voltage versus light power characteristics is minimized. Similarly, when controlling the bias voltage of the Q channel to the optimum operating point, by adjusting at least one of the bias voltage of the I channel and the bias voltage of the phase shifter 15, the distortion of light power characteristics is minimized. The distortion of the light power characteristics at the time of pull-in to the optimum bias value at startup is corrected, so that the performance of the bias voltage control may be enhanced.

Figure 4:
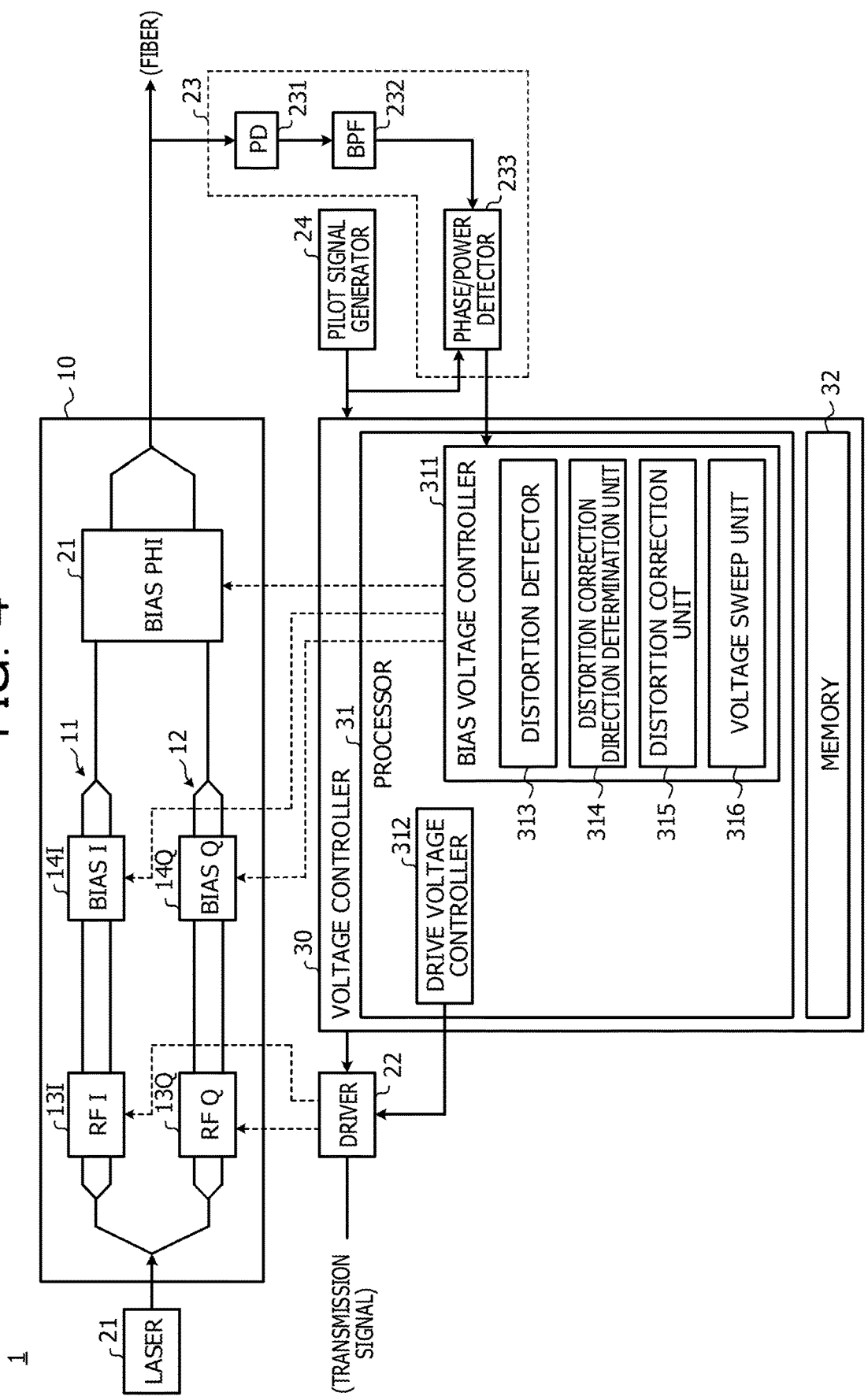
FIG. 4 is a schematic diagram of the optical transmitter according to an embodiment.

FIG. 4 is a schematic diagram of an optical transmitter 1 of the embodiment. The optical transmitter 1 includes a laser 21, an optical modulator 10, a driver 22 for driving the optical modulator 10, a monitor circuit 23 that monitors the output of the optical modulator 10, a pilot signal generator 24, and a voltage controller 30.

The laser 21 as a light source may have a wavelength variable function so as to be compatible with a wavelength division multiplex (WDM) transmission system. The optical modulator 10 is an I/Q modulator, and includes the first modulator 11, the second modulator 12, and the phase shifter 15. In this example, the first modulator 11 is used for the I channel and the second modulator 12 is used for the Q channel. The optical modulator 10 is used for multi-value (four or more values) modulation, such as QPSK, 16-QAM, and 64QAM.

The first modulator 11 is provided with an electrode 13I to which a drive signal RFI is input and an electrode 14I to which a bias voltage (Bias I) is applied. The second modulator 12 is provided with an electrode 13Q to which the drive signal RF2 is input and an electrode 14Q to which a bias voltage (Bias Q) is applied. Schematically, the electrode 13I and, the electrode 14I are depicted as separate electrodes, and the electrode 13Q and the electrode 14Q are depicted as separate electrodes. However, they may be formed as continuous electrodes. The positions, types, structures, patterns, etc. of the electrodes are appropriately designed.

The driver 22 generates a high-speed drive signal from a transmission signal (client signal or data signal), inputs the logical value of the first data and its inverted signal to the first modulator 11, and the logical value of the second data and its inverted signal to the second modulator 12. These drive signals may be input to the first modulator 11 and the second modulator 12 after being amplified. Light input from the laser 21 to the optical modulator 10 is split into two. Each light wave propagates through the first modulator 11 and the second modulator 12 and is modulated by a high-speed drive signal. The phase shifter 15 gives a phase difference of 90° to the light propagating through the first modulator 11 and the light passing through the second modulator 12. The multiplexed optical signal is output from the optical modulator 10.

The voltage controller 30 includes a processor 31 and a memory 32. The processor 31 includes a functional block that operates as a bias voltage controller 311 and a functional block that operates as a drive voltage controller 312. The bias voltage controller 311 includes a distortion detector 313, a distortion correction direction determination unit 314, a distortion correction unit 315, and a voltage sweep unit 316, and controls the bias voltage applied to the optical modulator 10, and corrects the distortion of the light power characteristics. The drive voltage controller 312 controls the potential of the center of the amplitude of the high-speed drive signal generated by the driver 22 and the peak voltage.

Figure 1:
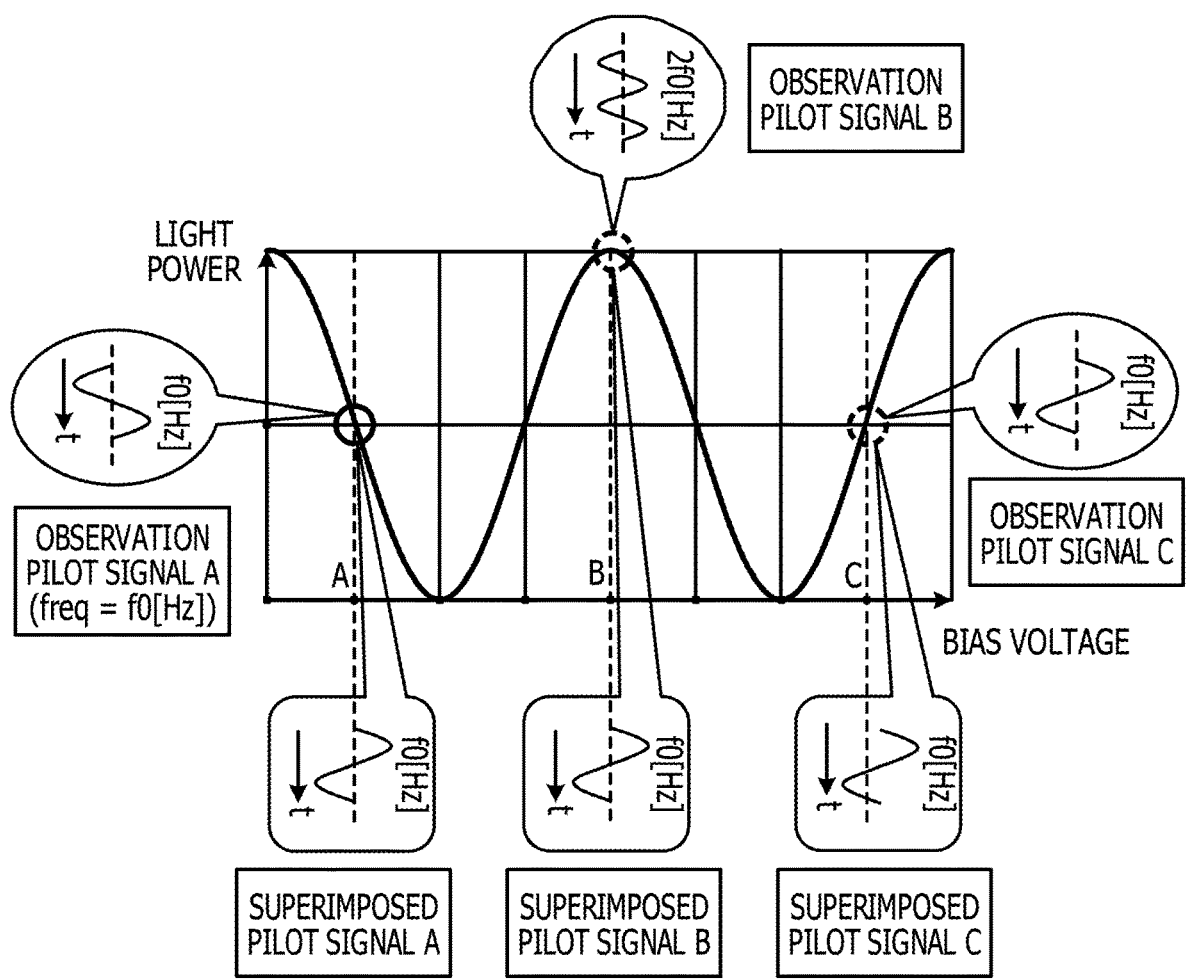
FIG. 1 is a schematic diagram of a superimposed pilot signal and an observation pilot signal in bias voltage control.

Using the pilot signal generated by the pilot signal generator 24, the bias voltage controller 311 controls the bias voltage applied to the first modulator 11, the bias voltage applied to the second modulator 12, and the bias voltage ($\varphi$) applied to the phase shifter 15 to an optimum operating point. The illustration of the bias power supply is omitted. The pilot signal is a signal with a sufficiently lower speed than the drive signal. By superimposing the pilot signal on the bias voltage applied to the first modulator 11, the second modulator 12, and the phase shifter 15, a component in phase with or in reversed-phase with the superimposed pilot signal is detected from the output light of the optical modulator 10 according to the deviation direction of the bias voltage as illustrated in FIG. 1.

The monitor circuit 23 includes a photodiode (PD) 231, a band pass filter (BPF) 232, and a phase/power detector 233, and monitors output light of the optical modulator 10. The output light of the optical modulator 10 is converted into an electric signal by the PD231 and a current-voltage conversion circuit (not illustrated). A component having the same frequency as the pilot signal is extracted by the BPF232. The phase/power detector 233 detects the power of the detected low frequency component, performs synchronous detection using the superimposed pilot signal output from the pilot signal generator 24, and detects the phase of the low frequency component. Information on the phase and power of the detected low frequency signal is supplied to the bias voltage controller 311.

The voltage sweep unit 316 of the bias voltage controller 311 adjusts the bias voltage to the optimum operating point according to the phase of the detected pilot component. In a case where the optimum operating point is set to the valley of the light power characteristics, when the phase of the pilot signal to be superimposed and the phase of the detected low frequency component are identical to each other, the voltage sweep unit 316 performs control in a direction to lower the bias voltage. When the phase of the pilot signal to be superimposed and the phase of the detected low frequency component are opposite in phase, the voltage sweep unit 316 performs control in a direction to increase the bias voltage. When the bias voltage is set to the optimum operating point, the low frequency component included in the output light of the optical modulator 10 is zero or minimum.

The bias voltage controller 311 determines presence or absence of distortion and the correction direction of the light power characteristics by using information on the power of the low frequency component and corrects the distortion of the light power characteristics in the bias voltage setting control. The drift control of the bias voltage applied to the optical modulator 10 is also performed during the operation of the optical transmitter 1. The distortion control of the light power characteristics is performed together with the pulling-in of the bias voltage to the optimum operating point at the time of startup. Detection of distortion by the distortion detector 313, determination of the correction direction by the distortion correction direction determination unit 314, and distortion correction by the distortion correction unit 315 will be described below.

Figure 5:
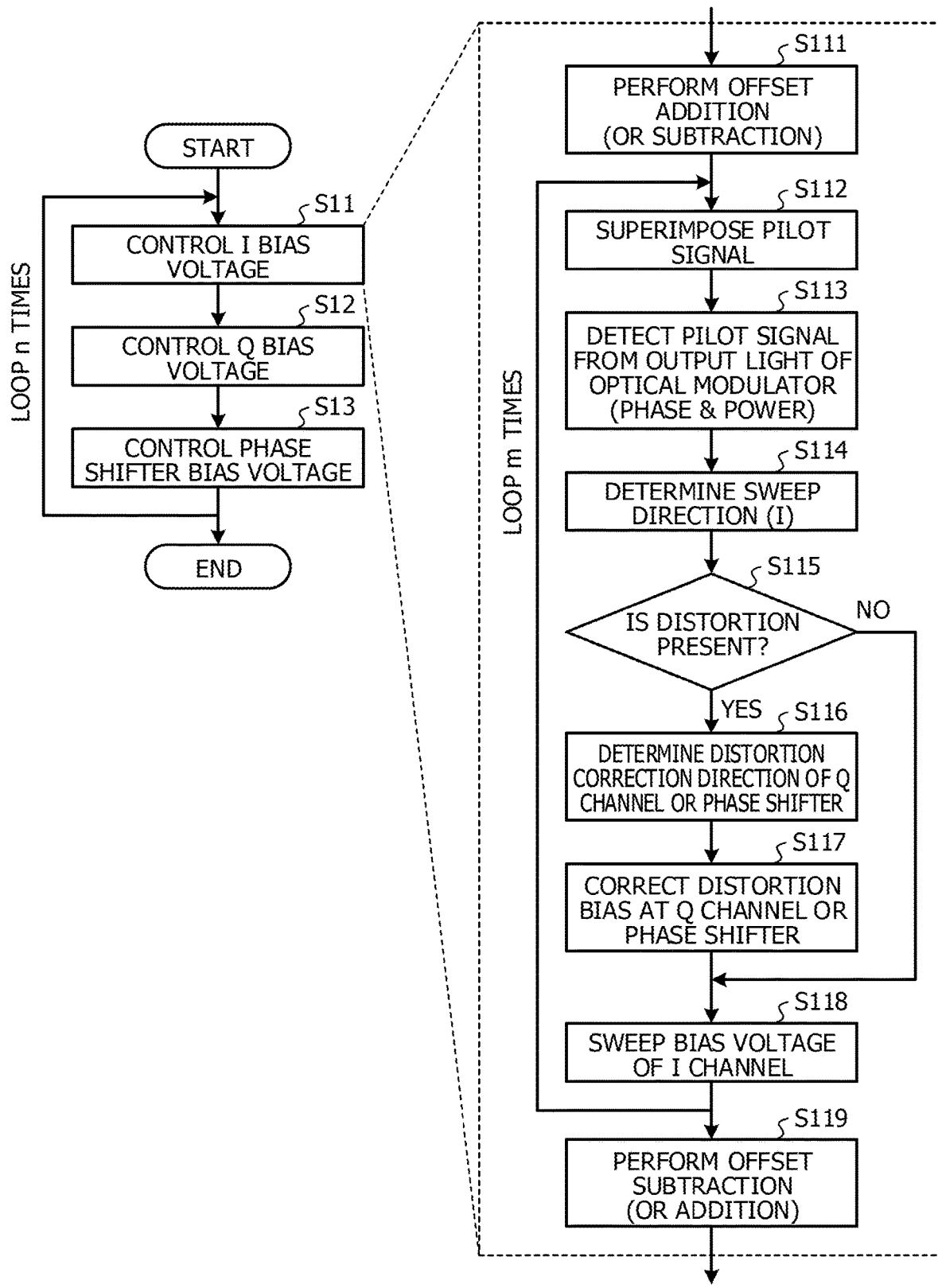
FIG. 5 is a control flow of bias voltage and light power distortion during I channel control.

FIG. 5 is a control flow of the bias voltage and the light power distortion performed at the time of I channel control of the optical modulator 10. When the optical transmitter 1 is activated, the bias voltage controller 311 sequentially performs bias voltage control of the I channel (S11), bias voltage control of the Q channel (S12), and bias voltage control of the phase shifter 15 (S13). A series of operations from S11 to S13 are repeated n times. Each step of S11 to S13 is performed with m voltage sweeps. The order and the number of times of the control are not limited to that of the example of FIG. 5. S11 to S13 may be performed in any order. The number of times of control (voltage sweep) of each step and the number of times of loop of the entire steps are appropriately set according to the specification of the optical transmitter 1. In the bias setting control at the time of starting, the driver 22 is turned off, so that there is no input of the high-speed drive signal to the optical modulator 10.

The bias voltage control of the I channel (S11) is characterized by a distortion detection of light power characteristics (S115), a determination of a distortion correction direction (S116) using a bias voltage other than the bias voltage of the I channel (for example, a bias voltage of the Q channel), and a distortion correction (S117).

When the bias voltage control (S11) of the I channel is started, offset addition or subtraction is performed (S111). In the offset addition (or subtraction), by slightly shifting the bias voltage other than the bias voltage of the channel to be controlled, the combination of the I channel, the Q channel, and the bias voltage of the phase shifter 15 is increased, and immobilization (erroneous convergence) with the shape of the light power characteristics distorted is avoided. When the initial values of bias voltages of the I channel and the Q channel are both at the quenching point and the bias voltage of the phase shifter 15 is in a state of not giving a phase difference between I and Q, it is not possible to obtain light output from the optical modulator 10. By adding the offset voltage to (or subtracting the offset voltage from) the bias voltage (in this example, the bias voltage of Q channel or the phase shifter 15) other than the bias voltage of the channel to be controlled, there is also an effect that light output may be obtained at the start of control. This offset addition (or subtraction) is a process different from the distortion correction of the light power characteristics.

Next, the pilot signal is superimposed on the initial value (1 V, for example) of the bias voltage of the I channel (S112), and the power and the phase of the pilot component are detected from the output light of the optical modulator 10 (S113). Although this output light does not include modulated data, the output light receives a change in output power due to application of the bias voltage. The power value and phase of the detected pilot component may be recorded in the memory 32. In accordance with the phase of the pilot component, the sweep direction of the bias voltage of the I channel is determined (S114).

Based on the power information of the pilot component, the bias voltage controller 311 determines whether the light power characteristics is distorted (S115). A specific method of determining presence or absence of distortion will be described later. When the light power characteristics is distorted ("YES" in S115), the direction of the distortion correction is determined (S116). The direction of the distortion correction is the adjustment direction of the bias voltage of the Q channel in a direction to reduce the distortion of the light power characteristics. The distortion is corrected by adjusting the bias voltage of the Q channel in accordance with the direction of distortion correction (S117). Thereafter, the bias voltage of the I channel is swept with a predetermined step size in the direction determined in step S114 (S118). Returning to step S112, the loop of S112 to S118 is repeated a predetermined number of times (m times). Since the distortion of the light power characteristics is corrected by each voltage sweep, it is possible to suppress persistence and immobilization of the distortion.

When the bias voltage of the I channel is set to the optimum operating point and the distortion correction of the light power characteristics is completed, the offset voltage of the Q channel or the phase shifter 15 is restored to the original value (S119), and the process proceeds to the bias control of the next branch.

Figure 6:
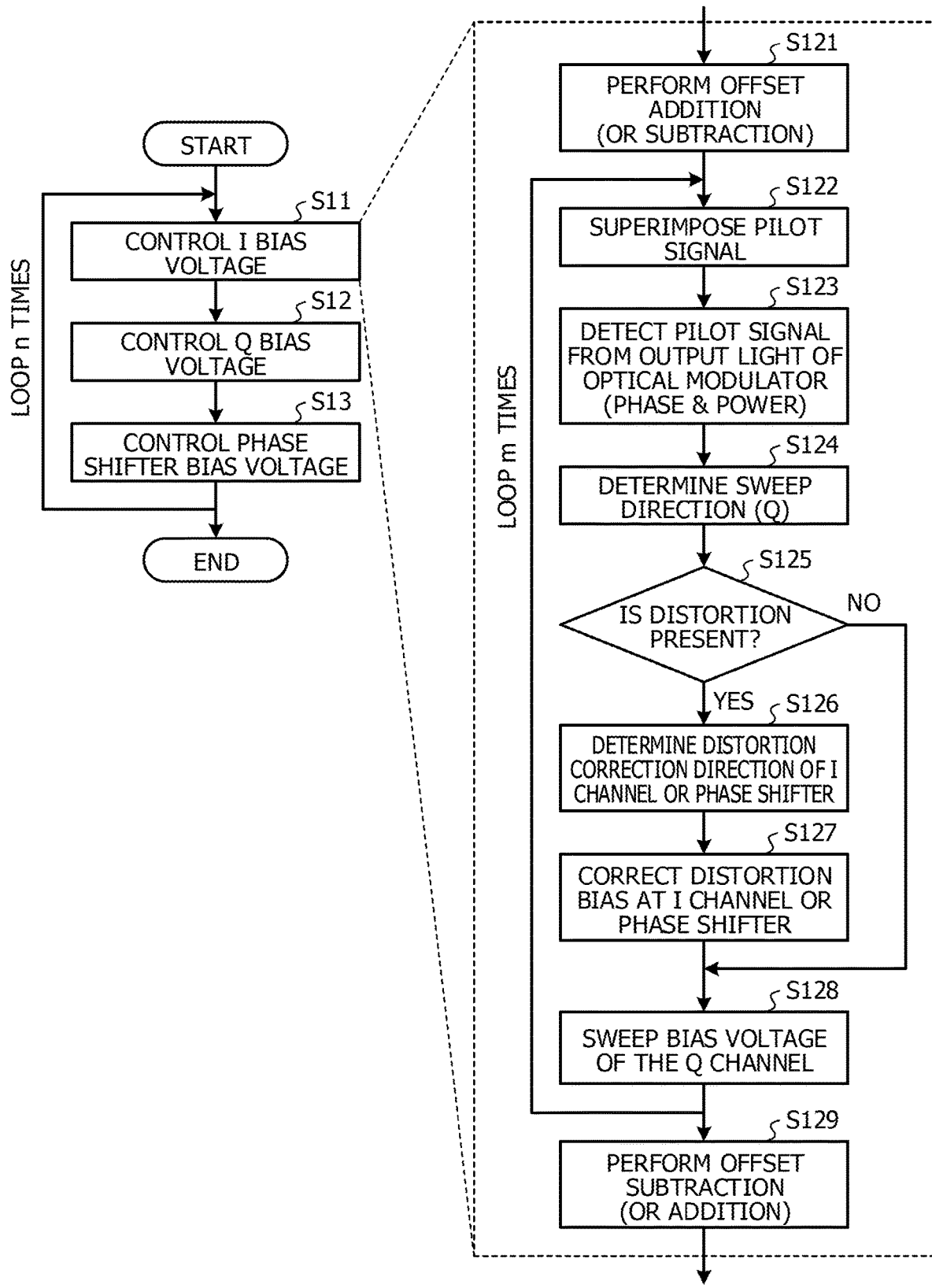
FIG. 6 is a control flow of bias voltage and light power distortion during Q channel control.

FIG. 6 is a control flow of the bias voltage and the light power distortion performed at the time of Q channel control of the optical modulator 10. When the control of the bias voltage and the light power distortion of the I channel is ended, control of the Q channel is started (S12). In the bias control of the Q channel, the offset voltage is added to (or subtracted from) the bias voltage of the I channel or the phase shifter 15 (S121). When maintaining the bias voltage at the optimum operating point obtained by the I channel without resetting, step 121 may be omitted.

The pilot signal is superimposed on the bias voltage (initial value) of the Q channel (S122), and the power and the phase of the pilot component are detected from the output light of the optical modulator 10 (S123). Although this output light does not include modulated data, the output light receives a change in output power due to application of the bias voltage. The power value of the detected pilot component may be recorded in the memory 32. In accordance with the phase of the pilot component, the sweep direction of the bias voltage of the Q channel is determined (S124).

Based on the power information of the pilot component, the bias voltage controller 311 determines whether the light power characteristics is distorted (S125). When the light power characteristics is distorted ("YES" in S125), the direction of distortion correction is determined (S126), and the bias voltage of the phase shifter 15 or the I channel is adjusted in the direction of distortion correction (S127). Thereafter, the bias voltage of the Q channel is swept with a predetermined step size in the direction determined in step S124 (S128). When the loop of steps S122 to S128 is repeated a predetermined number of times (m times) to set the bias voltage of the Q channel to the optimum initial operating point, and the distortion correction of the light power characteristics is completed, the offset voltage is restored to the original value as appropriate (S129), and the process proceeds to bias control of the phase shifter 15. The bias control of the phase shifter 15 is performed in the same manner. As a result, distortion of the light power characteristics is minimized, the initial bias voltages of the I channel, the Q channel, and the phase shifter 15 are set. Although during the operation of the optical modulator 10, the optimum operating point drifts due to temperature fluctuation and secular change, the bias control following the drift is performed by the automatic bias control using the pilot signal.

Figure 7:
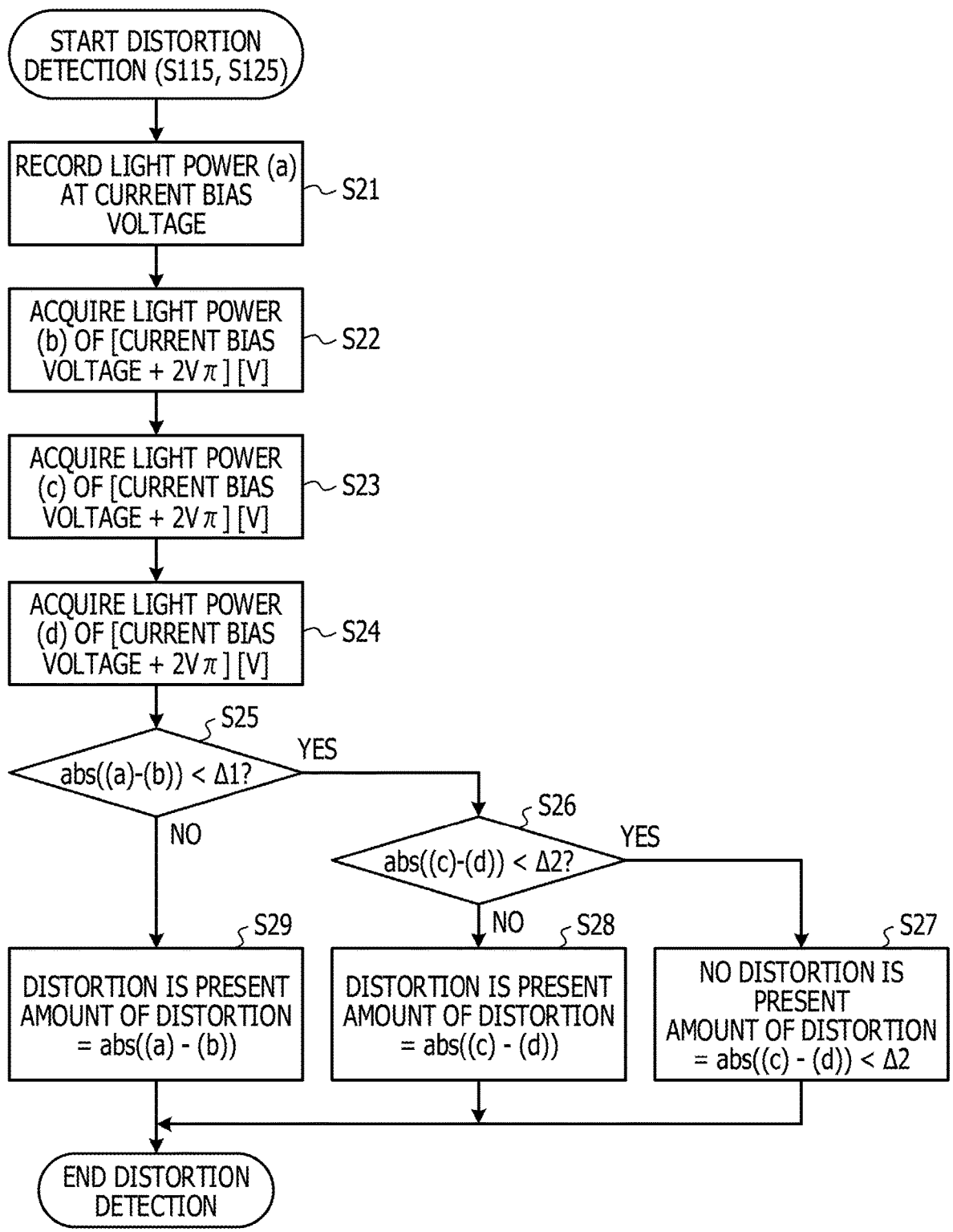
FIG. 7 is a flowchart of a distortion detection.

FIG. 7 is a process flow of the distortion detection step (S115 in FIG. 5 and S125 in FIG. 6). Distortion detection is performed by the distortion detector 313 of the bias voltage controller 311. For simplicity, distortion detection focusing on I channel bias control will be described. First, the light power (a) output from the optical modulator 10 at the current bias voltage is recorded (S21). The light power (a) is acquired in the phase and power detection step (S113) of the pilot component in FIG. 5. Since the output light from the optical modulator 10 is square-law detected by the PD231, the amplitude (voltage) value of the low frequency component extracted by the BPF23 is the light power.

Next, the bias voltage of the I channel is set to a voltage obtained by adding 2Vπ (V) to the current bias voltage. The light power (b) at this time is acquired and recorded in the memory 32 (S22). The light power (c) at a voltage obtained by adding Vπ (V) to the current bias voltage and the light power (d) at a voltage obtained by subtracting Vπ (V) from the current bias voltage are acquired and recorded (S23 and S24).

Next, it is determined whether the absolute value of the difference between the light power (a) and the light power (b) is smaller than a predetermined threshold value Δ1 (S25). When the magnitude of the difference between the light power (a) and the light power (b) is equal to or larger than the threshold value Δ1 ("NO" in S25) the light power characteristics at a point distant by one period (2Vπ) deviates more than the tolerance and is asymmetric, and it is determined that distortion is present (S29). The amount of distortion at this time is |(a)−(b)|.

When the absolute value of the difference between the light power (a) and the light power (b) is within the range of the threshold value Δ1 ("YES" in S25), the process proceeds to step S26. It is determined whether the absolute value of the difference between the light power (c) and the light power (d) is smaller than the threshold value Δ2. The threshold value Δ1 and the threshold value Δ2 may be the same or different. When the magnitude of the difference between the light power (c) and the light power (d) is equal to or larger than the threshold value Δ2 ("NO" in S26), the light power deviates more than the tolerance of the light power at the bias position which is away from the current bias voltage by half a period in both positive and negative directions, and it is determined that distortion is present (S28). The amount of distortion at this time is |(c)−(d)|. When the absolute value of the difference between the light power (c) and the light power (d) is within the range of the threshold value Δ2 ("YES" in S26), the profile of the light power characteristics is maintained within the tolerance, and it is determined that no distortion is present (S27). The distortion detection step (S115) is ended by performing any of the determinations of S27 to S29.

Figure 8:
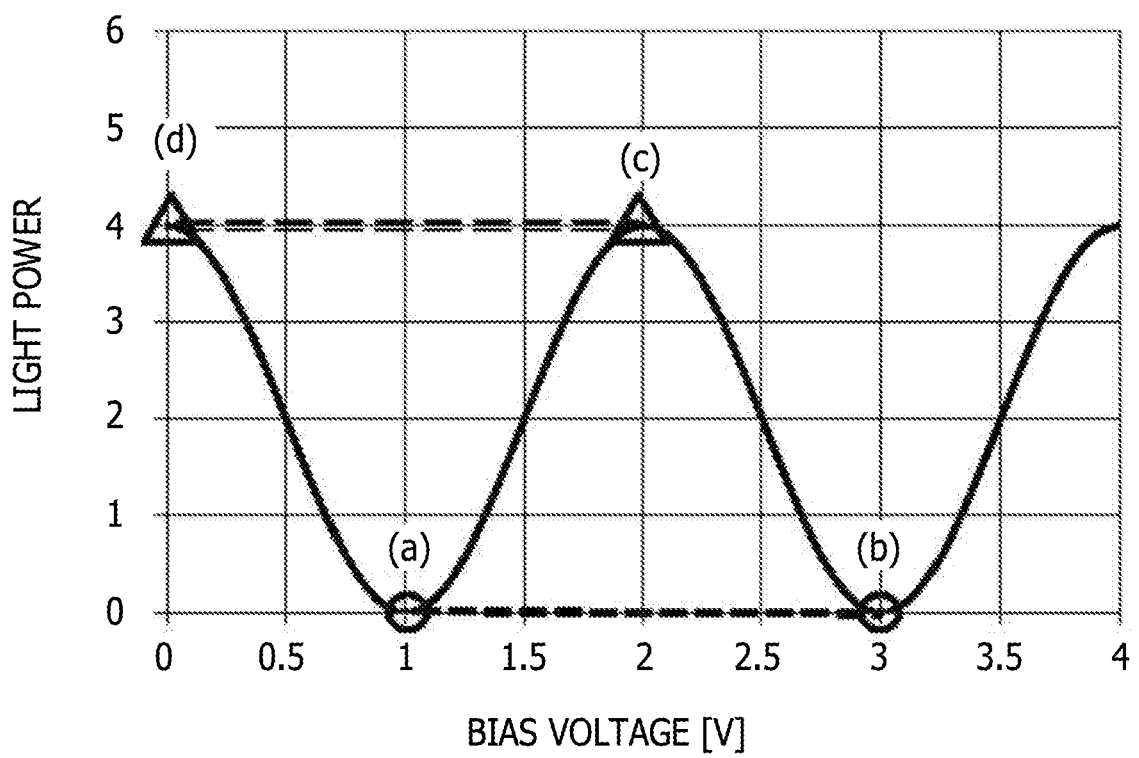
FIG. 8 is a diagram for visually illustrating presence or absence of distortion in light power characteristics.
Figure 9:
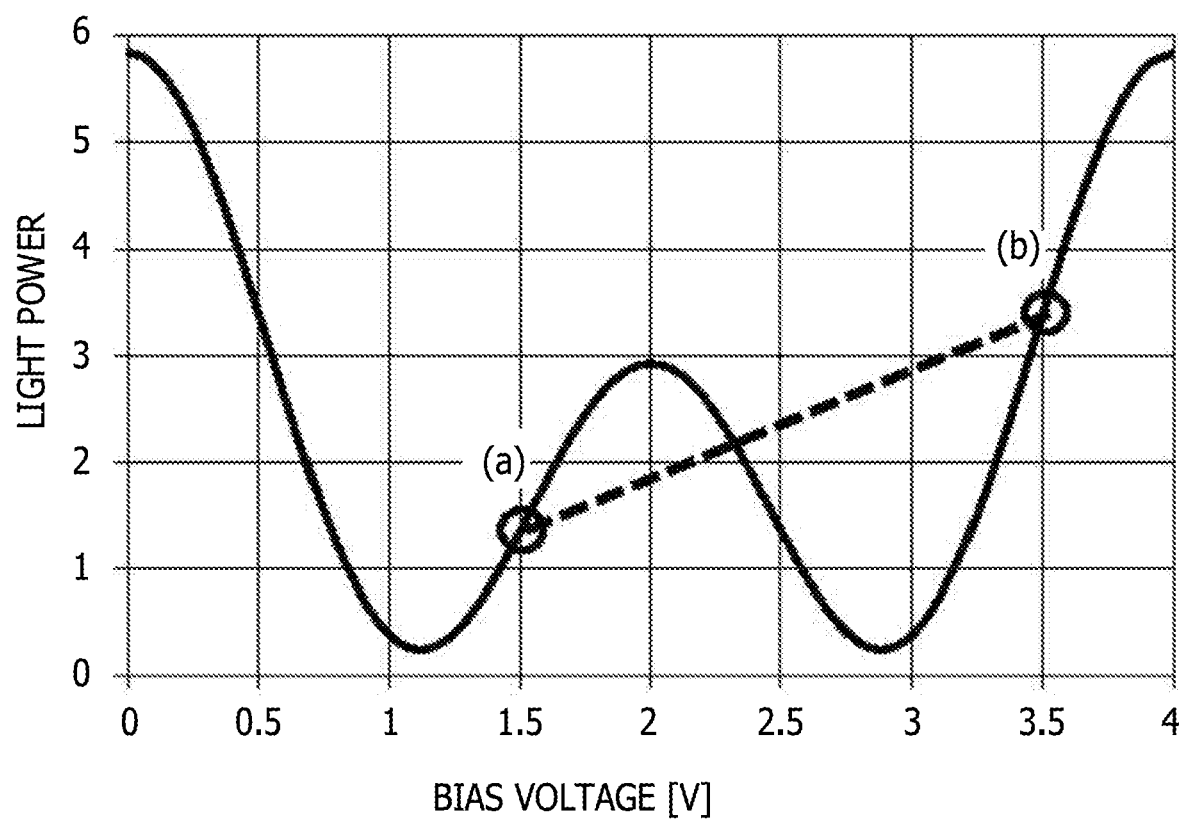
FIG. 9 is a diagram for visually illustrating presence or absence of distortion in light power characteristics.
Figure 10:
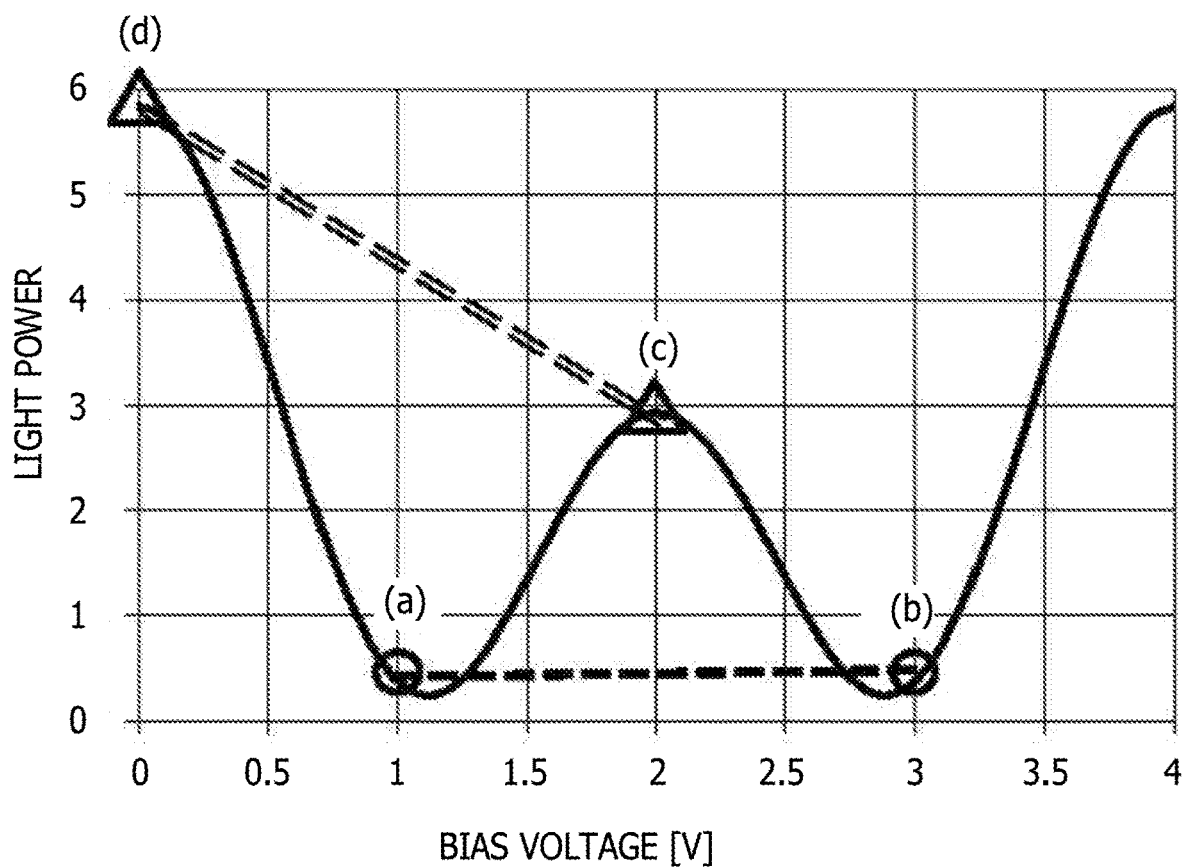
FIG. 10 is a diagram for visually illustrating presence or absence of distortion in light power characteristics.

FIGS. 8 to 10 are diagrams visually illustrating presence or absence of distortion in light power characteristics. In FIG. 8 to FIG. 10, Vπ is normalized to 1 V. FIG. 8 illustrates the light power characteristics when it is determined in step S27 in FIG. 7 that no distortion is present. Suppose the current bias voltage of the I channel is at the quenching point (for example, 1 V). The light power (a) in this case is close to zero. The light power (b) at a voltage shifted to the plus side by 2Vπ (for example 3 V) from the current bias voltage is also close to zero. In this case, the difference between the light power (a) and the light power (b) is within the allowable range, and it is determined that the (a) equals the (b).

The light power (c) at the voltage +Vπ (for example 2 V) from the current bias voltage and the light power (d) at the voltage of −Vπ (for example, 0 V) are close to the maximum of the light power characteristics, and the difference between the two powers is within the allowable range.

Figure 2A:
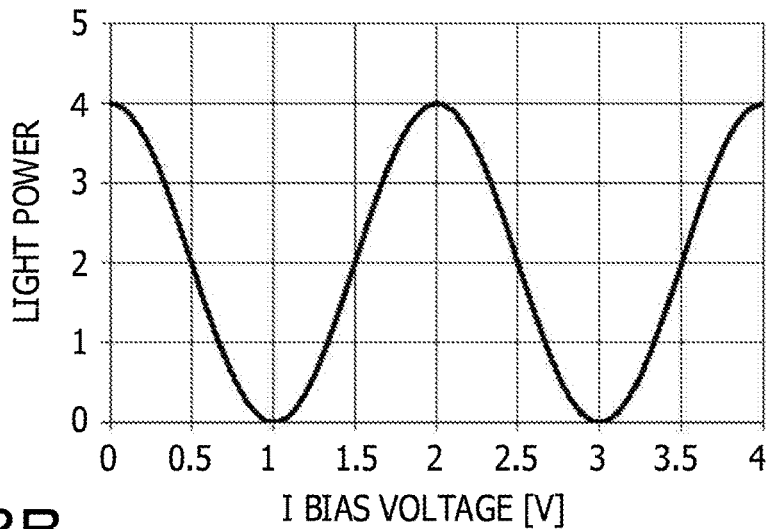
FIGS. 2A-2C are diagrams illustrating distortion of light power characteristics.
Figure 2B:
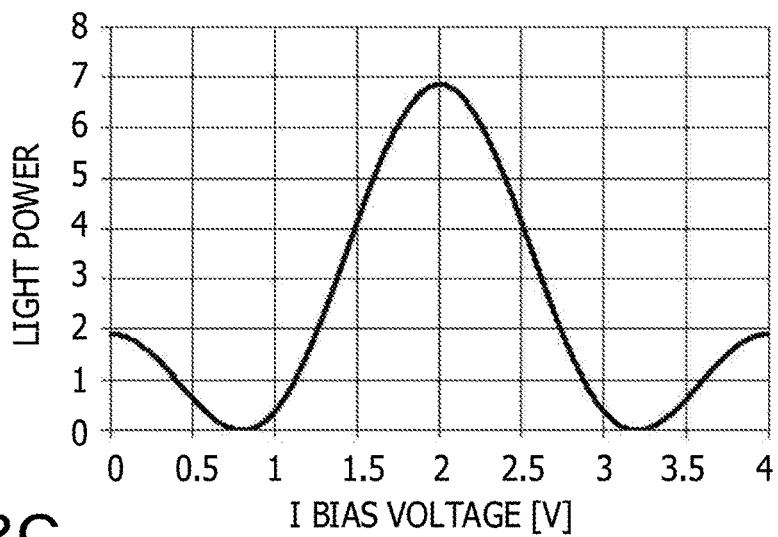
Figure 2C:
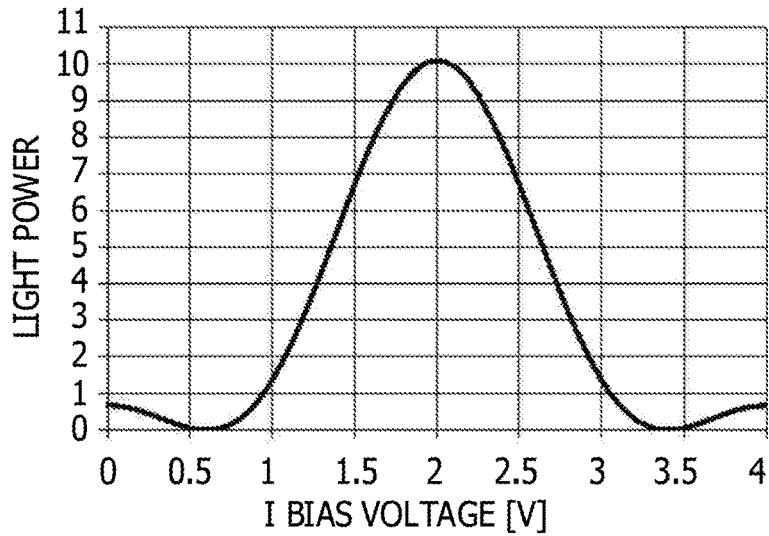

As can be seen from FIG. 2A and Equation (2), since the light power characteristics without distortion has a period of 2Vπ [V], with a combination of bias voltages that do not cause distortion, the light powers are equal at any bias voltages that are 2Vπ away from each other. However, even with a combination of bias voltages causing distortion, there is a singular point where the distortion component is zero at a period of 2Vπ [V]. Therefore, presence or absence of distortion of light power characteristics is determined by comparing the light power (c) and the light power (d) at the points that are away symmetrically from the current bias voltage by Vπ in the positive direction and the negative direction respectively. In FIG. 8, since the light power (a) is equal to the light power (b), and the light power (c) is equal to the light power (d), it is determined that no distortion is present. "The light power is equal" is synonymous with "the absolute value of the difference in the light powers is smaller than the threshold".

FIG. 9 illustrates the light power characteristics when it is determined that distortion is present ((a)≠(b)) in step S29 in FIG. 7. The value of the light power (a) at the current bias voltage (for example, 1.5 V) and the value of the light power (b) at the bias voltage (3.5 V) away from the current bias voltage by one period (2Vπ) are different from each other, exceeding the allowable range, and the cosine curve is distorted.

FIG. 10 illustrates the light power characteristics when it is determined that distortion is present ((a)=(b) but (c)≠(d)) in step S28 in FIG. 7. The value of the light power (a) at the current bias voltage (for example, 1 V) and the value of the light power (b) at the bias voltage (3 V) away from the current bias voltage by one period (2Vπ) are substantially identical to each other. However, the bias voltage shifted by a half period (+Vπ) in the plus direction from the current bias voltage and the value of the light power at a bias voltage deviated by a half period (−Vπ) in the minus direction is different, and the light power characteristics is distorted.

As described above, when a low frequency component is detected from the output of the optical modulator 10 in the bias voltage control process of the channel of interest, the light power is measured by shifting the bias voltage value of the channel from the current bias voltage value to +2Vπ, +Vπ, and −Vπ. The light powers at two sets of bias voltage values are compared to determine presence or absence of distortion of the light power characteristics.

Figure 11A:
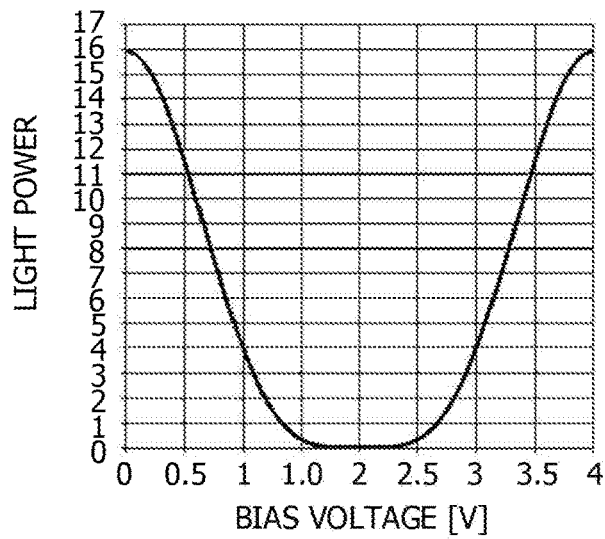
FIGS. 11A-11C are diagrams illustrating a determination of a distortion correction direction.
Figure 11B:
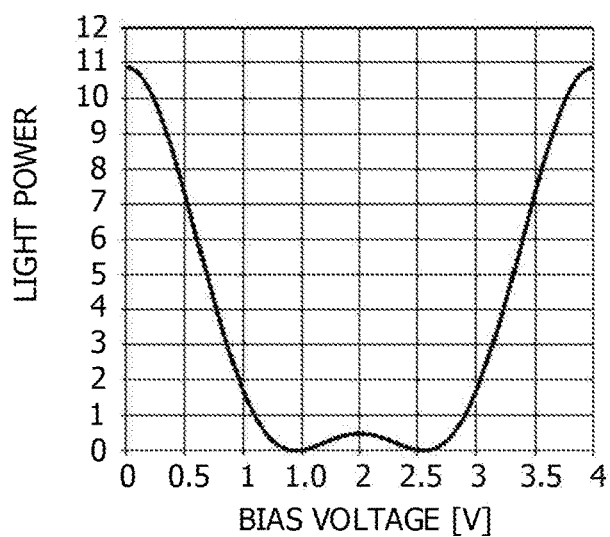
Figure 11C:
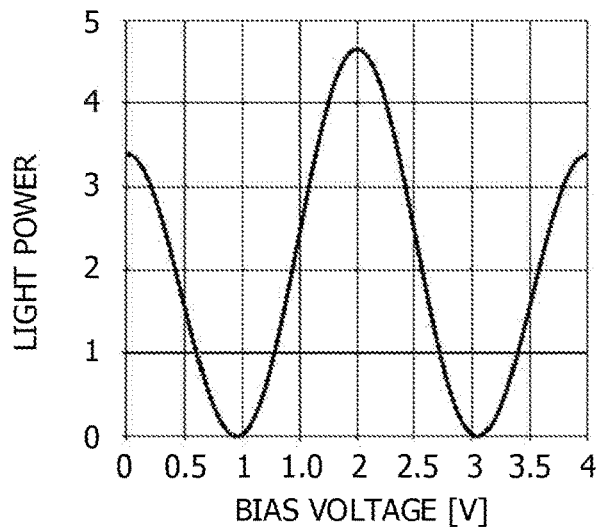

FIGS. 11A-11C are diagrams illustrating the determination of the distortion correction direction (S116 in FIG. 5 and S126 in FIG. 6). Focusing on the control of the bias voltage of the I channel, and FIGS. 11A-11C illustrate the light power characteristics of the I channel. Among them, FIG. 11B illustrates the light power characteristics in a state where the bias voltage of the Q channel is not moved at the time when it is determined that distortion is present in step S115 in FIG. 5. FIG. 11A illustrates the light power characteristics in the state where the bias voltage of the Q channel is shifted by −Vπ/2 (¼ period on the minus side) from that of the state of FIG. 11B. FIG. 11C illustrates the light power characteristics in the state where the bias voltage of the Q channel is shifted by −Vπ/2 (¼ period on the plus side) from that of the state of FIG. 11B.

The correction direction in which the distortion is reduced is determined by increasing or decreasing the amount of distortion when the bias voltage (the bias voltage of Q channel or the phase shifter 15) other than the bias voltage of the channel to be controlled (I channel) is made to change. In the example of FIG. 11C, distortion of the light power characteristics is small by changing the bias voltage of the Q channel by +Vπ/2. Therefore, the bias voltage of the Q channel is adjusted in the plus direction so that the light power characteristics curve is close to the correct cosine curve.

In the example of FIG. 11A and FIG. 11C, the bias voltage of the Q channel is made to change by ±Vπ/2 from the current state in order to clearly illustrate the distortion change. However, in the determination processing of the actual distortion correction direction, a bias voltage other than the bias voltage of the channel to be controlled may be made to change, for example, in the range from ±Vπ/8 to ±Vπ/4 to determine the direction of correction.

Figure 12:
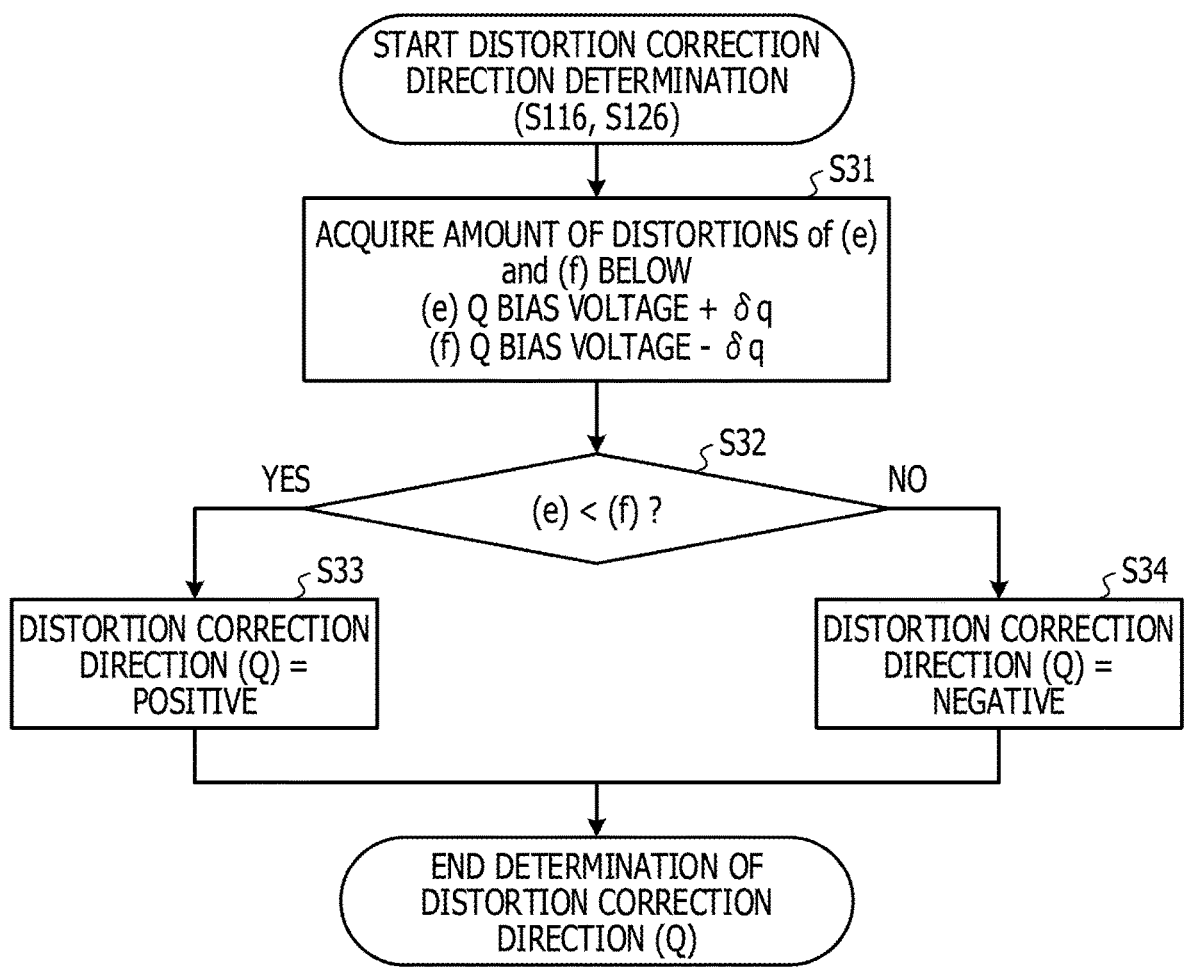
FIG. 12 is a diagram illustrating an example of a determination flow of a distortion correction direction.

FIG. 12 is an example of a determination flow of the distortion correction direction. The bias voltage of the I channel is to be controlled. When distortion is detected in the light power characteristics ("YES" in S115 in FIG. 5), the amount of distortion (e) when a bias voltage other than the bias voltage of the I channel, for example, the bias voltage of the Q channel, is shifted by +δq and the amount of distortion (f) when shifted by −δq are acquired (S31). The amount of distortion (e) and the amount of distortion (f) are calculated, with the bias voltage of the Q channel shifted by δq in the plus and minus directions, by measuring the light power when the bias voltage of the I channel is shifted by +2Vπ and the light power when the bias voltage of the I channel is shifted by ±Vπ as illustrated in FIG. 7. The absolute value of the obtained light power difference is defined as the amount of distortion.

The amount of distortion (e) and the amount of distortion (f) are compared (S32). When the amount of distortion (e) is smaller than the amount of distortion (f) ("YES" in S32), the change in the bias voltage of the Q channel in the plus direction is the requested direction of distortion correction (S33). When the amount of distortion (f) is equal to or less than the amount of distortion (e) ("NO" in S32), the minus direction is the direction of distortion correction of the Q channel (S34). This determines the direction of distortion correction.

Figure 13:
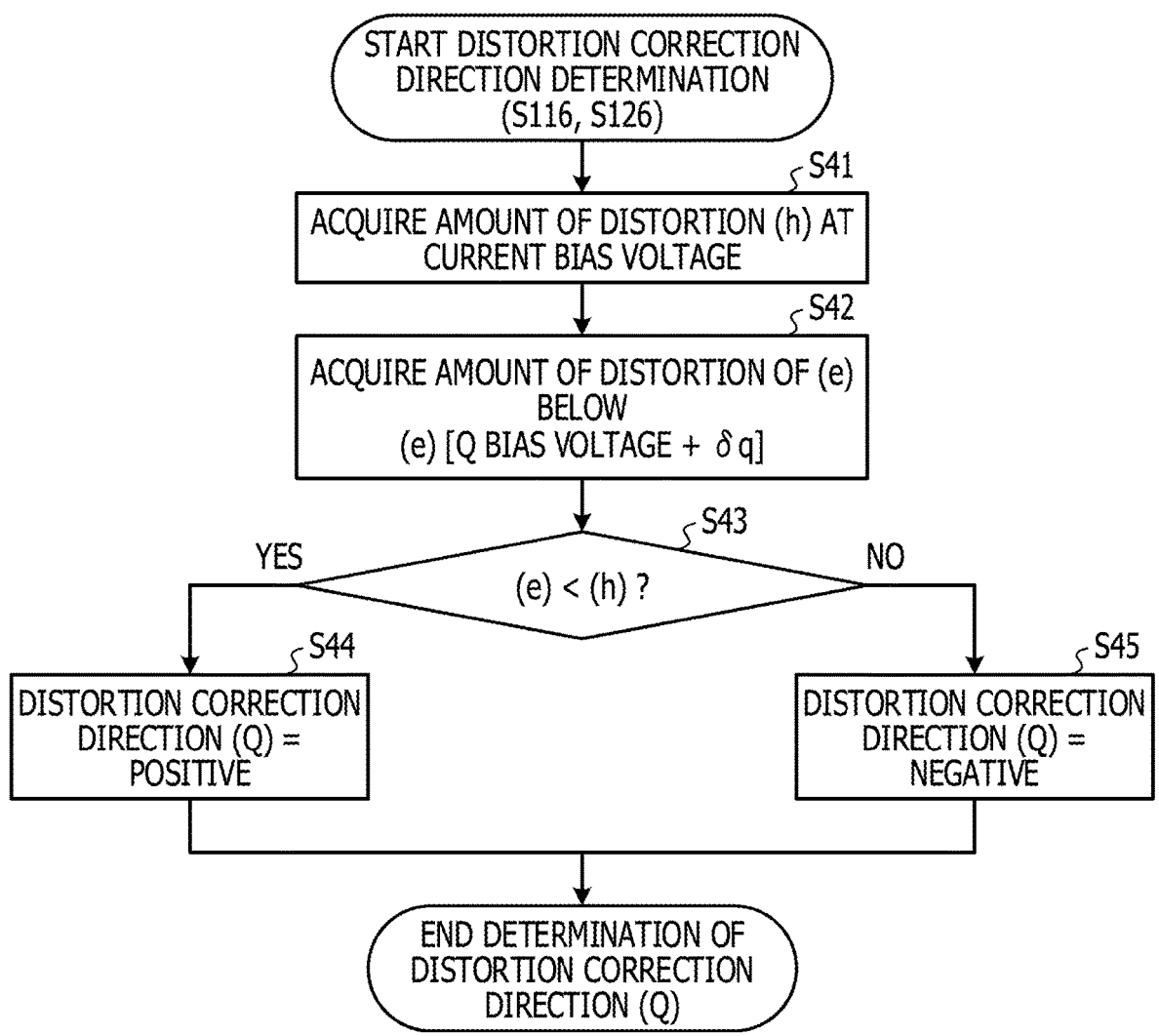
FIG. 13 is a diagram illustrating another example of a distortion correction direction determination flow.

FIG. 13 illustrates another example of the determination flow of the distortion correction direction. The bias voltage of the I channel is to be controlled. When distortion is detected in the light power characteristics ("YES" in S115 in FIG. 5), the amount of distortion (h) at the current bias voltage is acquired (S41). The amount of distortion (h) is acquired in the distortion detection process of FIG. 7 (S28 or S29). Next, the amount of distortion (e) when a bias voltage other than the bias voltage of the I channel, for example, the bias voltage of the Q channel is shifted by +δq is acquired (S42). The amount of distortion (e) and the amount of distortion (h) are compared (S43). When the amount of distortion (e) is smaller than the amount of distortion (h) ("YES" in S43), the plus direction is the direction of distortion correction of the Q channel (S44). When the amount of distortion (h) is equal to or less than the amount of distortion (e) ("NO" in S43) the minus direction is the direction of distortion correction of the Q channel (S45). This determines the direction of distortion correction.

Figure 14:
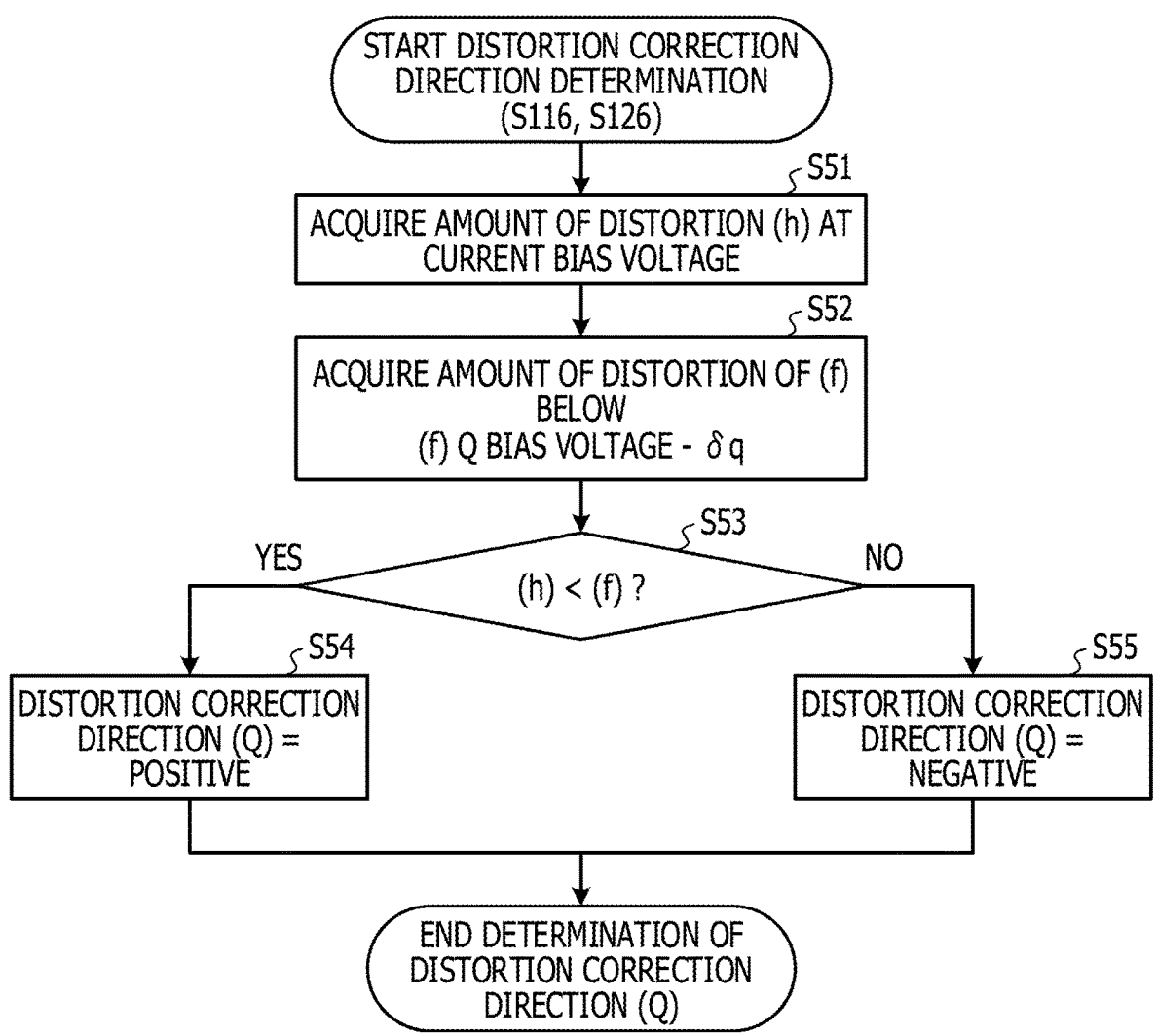
FIG. 14 is a diagram illustrating still another example of the distortion correction direction determination flow.

FIG. 14 illustrates still another example of the determination flow of the distortion correction direction. The bias voltage of the I channel is to be controlled. When distortion is detected in the light power characteristics ("YES" in S115 in FIG. 5), the amount of distortion (h) at the current bias voltage is acquired (S51). The amount of distortion (h) is acquired in the distortion detection process of FIG. 7 (S28 or S29). Next, the amount of distortion (f) when a bias voltage other than the bias voltage of the I channel, for example, the bias voltage of the Q channel, is shifted by −δq is acquired (S52). The amount of distortion (f) and the amount of distortion (h) are compared (S53). When the amount of distortion (f) is larger than the amount of distortion (h) ("YES" in S53) the reverse direction, for example, the plus direction is the direction of distortion correction of the Q channel (S54). When the amount of distortion (f) is equal to or smaller than the amount of distortion (h) ("NO" in S53) the minus direction is the direction of distortion correction of the Q channel (S55). This determines the direction of distortion correction.

Figure 15:
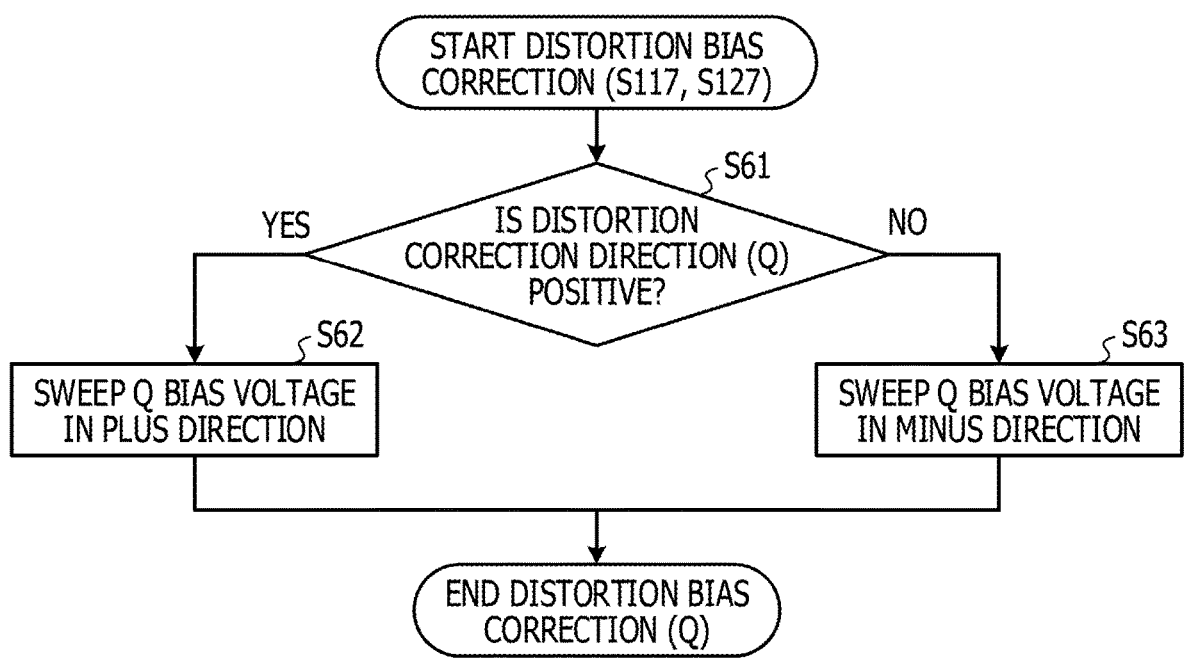
FIG. 15 is a flowchart of a distortion correction.

FIG. 15 is a flowchart of distortion correction. When the direction of distortion correction is determined by any of the methods of FIGS. 12 to 14, the bias voltage of the Q channel is corrected based on the determination result. The correction of the bias voltage of the Q channel is to finely adjust the bias voltage of the Q channel (or the phase shifter 15) in order to correct the distortion of the light power characteristics in the setting control of the bias voltage of the I channel. For example, it is determined whether the distortion correction direction in the Q channel is the plus direction or the minus direction (S61). When the correction direction is the plus direction ("YES" in S61), the bias voltage of the Q channel is swept in the plus direction with a predetermined step size (S62). This step size may be the same as or different from the step size of the voltage sweep of bias control of the I channel of interest. When the correction direction is the minus direction ("NO" in S61) the bias voltage of the Q channel is swept in the minus direction with a predetermined step size (S63). As a result, the distortion of the light power characteristics is corrected.

Figure 16:
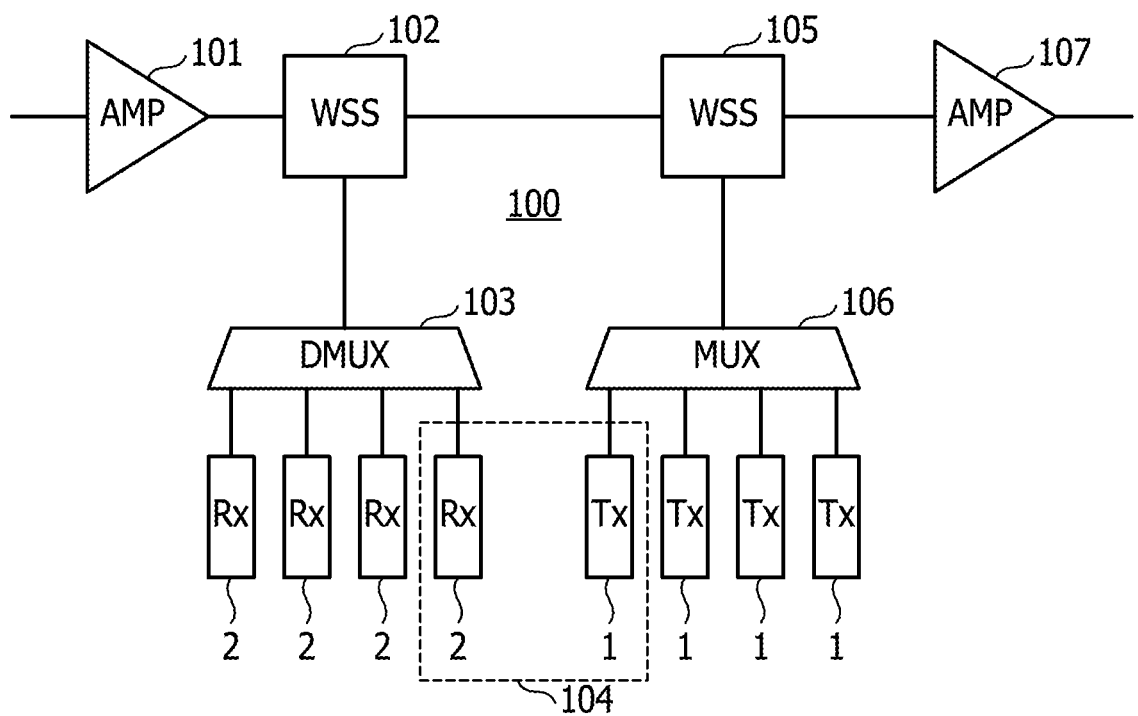
FIG. 16 is a schematic diagram of an optical transmission apparatus to which the optical transmitter according to the embodiment is applied.

FIG. 16 is a schematic diagram of an optical transmission apparatus 100 to which the optical transmitter 1 of the embodiment is applied. As an example, the optical transmission apparatus 100 is a reconfigurable optical add-drop multiplexer (ROADM) used in an optical network (optical transmission system). The optical transmission apparatus 100 includes optical amplifiers 101 and 107 (denoted as "AMP"), wavelength selective switches 102 and 105 (denoted as "WSS"), a multiplexer 106 (denoted as "MUX"), a plurality of optical transmitters 1 (denoted as "Tx") connected to the MUX 106, a demultiplexer 103 (denoted as "DMUX"), and a plurality of optical receivers 2 (denoted as "Rx") connected to the DMUX 103. Generally, the optical transmitter 1 and an optical receiver 2 may be arranged in a blade or a unit as an optical transponder 104. The optical transmission apparatus 100 may be provided with a control device for controlling the overall operation of the ROADM.

The receiving AMP 101 receives and amplifies the light (WDM light) transmitted through an input light transmission line, and outputs the amplified optical signal to the WSS102. The transmitting AMP 107 amplifies the transmission light (WDM light) input from the WSS105 and transmits the amplified transmission light to an output light transmission line.

The optical transmission apparatus 100 has a function of dropping, adding and passing light with any wavelength included in the WDM light. For example, the optical transmission apparatus 100 transmits the received WDM light input from the AMP 101 to the light transmission line of another route (Degree) by a wavelength unit of the light included in the WDM light, split (drop) the light to the optical receiver 2 of the destination port and makes the light pass through toward the direction of the AMP 107. The optical transmission apparatus 100 inserts (add) WDM light received from the light transmission line of another route and transmitted light from the optical transmitter 1 to the received WDM light input from the direction of the AMP 101 by a wavelength unit.

The WSS102 splits the input WDM light and outputs the split light to the DMUX 103 and the WSS105. The output destination of the split light may include an light transmission line of another route. The split light output to the DMUX 103 is called "drop light", and the split light output to the WSS105 is called "through light".

The WSS105 selects and outputs the through light input from the WSS102 and the add light input from the MUX 106 by a wavelength unit. The wavelength to be selected in the WSS105 may include any wavelength included in the WDM light input from the light transmission line of another route.

The DMUX 103 wavelength-demultiplexes the drop light input from the WSS102 and outputs the wavelength-demultiplexed light to the optical receiver 2. When the optical receiver 2 is a coherent receiver, the optical receiver 2 selectively receives light of a target reception wavelength even if light with different wavelengths is input. Therefore, the DMUX 103 may be replaced with an optical coupler that splits the input drop light to the optical receiver 2.

The MUX 106 wavelength-multiplexes the add light input from the optical transmitter 1 and outputs the wavelength-multiplexed light to the WSS. One or both of the DMUX 103 and the MUX may be configured by a filter having a variable transmission band such as WSS, an optical coupler, or the like. The MUX 106 wavelength-multiplexes the add light input from the optical transmitter 1 and outputs the wavelength-multiplexed light to the WSS105.

The optical transmitter 1 performs a pull-in to an optimum bias voltage and a distortion correction of the light power characteristics at the time of startup. Since the optimum bias voltage is determined while reducing the distortion of the light power characteristics, the optical transmitter 1 has a high control performance to the optimum operating point (convergence point of bias voltage). Unlike the conventional automatic bias control, it is possible to suppress deterioration of the convergence performance to the optimum bias point due to the distortion of the light power characteristics, which changes ceaselessly during the control. The configuration and the method of the embodiment are effective when newly installing or exchanging the optical transponder 104.

Although the embodiment has been described based on a specific embodiment, the embodiment is not limited to the above-described configurations. The optical modulator 10 is not limited to have the configuration in which MZ-type LN modulators are arranged in parallel. The optical modulator 10 may be applied to control of any optical modulator in which the optimum bias point drifts due to secular change. The present embodiment is also applicable to a case where a semiconductor modulator is used as the optical modulator. Although semiconductor modulators generally have less bias drift, compared with LN modulators, the semiconductor modulator is the same as the LN modulator in that quickly convergence of the DC bias voltage to the optimum operating point at startup is requested. In addition, distortion of the light power characteristics accompanying voltage sweep or the like may also occur to the semiconductor modulator.

The phase shifter 15 used in the I/Q modulator may be connected to only one of the first modulator 11 and the second modulator 12. Determination of presence or absence of distortion in the light power characteristics is not limited to be carried out by (i) a comparison between the light power at the current bias voltage and the light power at [the current bias voltage +2V$\pi$ [V]], and (ii) a comparison between the light power at [the current bias voltage +1V$\pi$ [V]] and the light power at [the current bias voltage −1V$\pi$ [V]]. A comparison of light powers at two bias points away from each other by integer times of the period of the light power characteristics, and a comparison of the light powers at two points away from each other by the same distance in the plus direction and the minus direction within the range of ±V$\pi$/2 to ±2V$\pi$ from the quenching point may be combined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transmitter comprising:
an optical modulator including a first modulator, a second modulator, and a phase shifter that provides a predetermined optical phase difference between the first modulator and the second modulator;
a light source that makes light enter the optical modulator; and
voltage control circuitry that
detects a distortion of light power characteristics from output light of the optical modulator in a state where no data signal is input to the optical modulator,
adjusts a second bias voltage applied to the second modulator or the phase shifter to correct the distortion when controlling a first bias voltage applied to the first modulator.

2. The optical transmitter according to claim 1,
wherein the voltage control circuitry that
sweeps a first bias voltage applied to the first modulator to determine an optimum bias voltage to be set in the first modulator, and
detects the distortion of the light power characteristics in an operation of determining the optimum bias voltage.

3. The optical transmitter according to claim 2, further comprising:
a pilot signal generator that generates a pilot signal superimposed on the first bias voltage; and
a monitor circuit that monitors output light of the optical modulator to detect a power and a phase of a pilot component included in the output light,
wherein the distortion detector compares a first power value at a first voltage value of the first bias voltage when the pilot component is detected with a second power value of the pilot component detected at a second voltage value away from the first voltage value by integer times of a period of the light power characteristics, to detect the distortion.

4. The optical transmitter according to claim 3,
wherein when a difference between the first power value and the second power value is smaller than a first threshold value, the voltage control circuitry compares a third power value at a third voltage value obtained by adding a predetermined value to the first voltage value with a fourth power value at a fourth voltage value obtained by subtracting the predetermined value from the first voltage value, to detect the distortion.

5. The optical transmitter according to claim 3,
wherein the voltage control circuitry detects a difference between the first power value and the second power value as an amount of distortion when the difference is equal to or greater than a first threshold value.

6. The optical transmitter according to claim 4,
wherein the voltage control circuitry detects a difference between the third power value and the fourth power value as an amount of distortion when the difference is equal to or greater than a second threshold value.

7. The optical transmitter according to claim 2,
wherein the voltage control circuitry is configured to determine a correction direction for adjusting the second bias voltage when the distortion is detected, and adjust the second bias voltage in accordance with the correction direction.

8. The optical transmitter according to claim 7,
wherein the voltage control circuitry is configured to compare a fifth power value of the pilot component at a fifth voltage value obtained by shifting the second bias voltage by a predetermined amount in a positive direction, with a sixth power value of the pilot component at a sixth voltage value obtained by shifting the second bias voltage by the predetermined amount in a negative direction to determine, as the correction direction, a direction in which a power value decreases.

9. The optical transmitter according to claim 7,
wherein the voltage control circuitry compares a first power value at a first voltage value of the first bias voltage when the pilot component is detected with a fifth power value of the pilot component at a fifth voltage value obtained by shifting the second bias voltage by a predetermined amount in the positive direction to determine, as the correction direction, a direction in which a power value decreases.

10. The optical transmitter according to claim 7,
wherein the voltage control circuitry compares a first power value at a first voltage value of the first bias voltage when the pilot component is detected with a sixth power value of the pilot component at a sixth voltage value obtained by shifting the second bias voltage by a predetermined amount in the negative direction to determine, as the correction direction, a direction in which a power value decreases.

11. An optical transmission apparatus comprising:
a plurality of optical transmitters; and
a multiplexer that multiplexes optical signals with different wavelengths, the optical signals being output from the plurality of optical transmitters,
wherein each of the plurality of optical transmitters includes
an optical modulator including a first modulator, a second modulator, and a phase shifter that provides a predetermined optical phase difference between the first modulator and the second modulator,
a light source that makes light enter the optical modulator, and
voltage control circuitry that
detects a distortion of light power characteristics from output light of the optical modulator in a state where no data signal is input to the optical modulator,
adjusts a second bias voltage applied to the second modulator or the phase shifter to correct the distortion when controlling a first bias voltage applied to the first modulator.

12. A method of controlling an optical transmitter, the method comprising:
making light from a light source enter an optical modulator including a first modulator, a second modulator, and a phase shifter that provides a predetermined optical phase difference between the first modulator and the second modulator in a state where no data signal is input;
monitoring output light of the optical modulator to detect a distortion of light power characteristics; and
adjusting a second bias voltage applied to the second modulator or the phase shifter to correct the distortion when controlling a first bias voltage applied to the first modulator.

13. The method of controlling an optical transmitter according to claim 12, further comprising:
sweeping a first bias voltage applied to the first modulator to determine an optimum bias voltage to be set in the first modulator;
detecting the distortion of the light power characteristics in a process of determining the optimum bias voltage; and
correcting the distortion by adjusting the second bias voltage applied to the second modulator or the phase shifter when the distortion is detected.

14. The method of controlling an optical transmitter according to claim 13, further comprising:
superimposing a pilot signal on the first bias voltage;
detecting a power and a phase of the pilot component included in the output light of the optical modulator; and
comparing a first power value at a first voltage value of the first bias voltage when the pilot component is detected with a second power value of the pilot component detected at a second voltage value away from the first voltage value by integer times of a period of the light power characteristics, to detect the distortion.

15. The method of controlling an optical transmitter according to claim 14, further comprising:
when a difference between the first power value and the second power value is smaller than a first threshold value, comparing a third power value at a third voltage value obtained by adding a predetermined value to the first voltage value with a fourth power value at a fourth voltage value obtained by subtracting the predetermined value from the first voltage value, to detect the distortion.

16. The method of controlling an optical transmitter according to claim 14, further comprising:
detecting a difference between the first power value and the second power value as an amount of distortion when the difference is equal to or greater than a first threshold value.

17. The method of controlling an optical transmitter according to claim 15, further comprising:
detecting a difference between the third power value and the fourth power value as an amount of distortion when the difference is equal to or greater than a second threshold value.

18. The method of controlling an optical transmitter according to claim 13, further comprising:
determining a correction direction for adjusting the second bias voltage when the distortion is detected; and
adjusting the second bias voltage in accordance with the correction direction.

* * * * *